United States Patent
Light

[15] 3,670,563
[45] June 20, 1972

[54] FIXTURE FOR SUPPORTING ARTICLES DURING VIBRATION TESTS

[72] Inventor: David J. Light, Huntsville, Ala.

[73] Assignee: The United States of America as represented by the Administrator of the National Aeronautics and Space Administration

[22] Filed: Oct. 5, 1970

[21] Appl. No.: 77,786

[52] U.S. Cl. ............................................. 73/71.6, 73/103
[51] Int. Cl. ....................................................... G01n 29/00
[58] Field of Search ........................................ 73/71.6, 103, 11

[56] References Cited

UNITED STATES PATENTS

| | | | |
|---|---|---|---|
| 3,534,595 | 10/1970 | Paull | 73/103 |
| 3,043,135 | 7/1962 | Coulduriotes | 73/103 |
| 3,194,052 | 7/1965 | Melzer | 73/103 |
| 3,106,653 | 10/1963 | Fowler | 73/71.6 X |

*Primary Examiner*—Richard C. Queisser
*Assistant Examiner*—Arthur E. Korkosz
*Attorney*—L. D. Wofford, Jr., W. H. Riggins and John R. Manning

[57] ABSTRACT

A fixture for supporting and securing articles, such as electrical components, during vibration testing of the articles comprising an integral annular unit having a series of spaced blind cavities formed in its top surface and a series of spaced blind cavities formed around its outer surface. Articles to be vibration tested are secured in the cavities of the fixture and the fixture is mounted on the driver head of a vibration exciter whereby the fixture is aligned with the driver coil of the exciter. The cavities may be in the form of partially threaded bores with an intermediate shoulder to receive a disk and a clamping nut for securing test items in the bores.

8 Claims, 4 Drawing Figures

PATENTED JUN 20 1972

INVENTOR
DAVID J. LIGHT

BY Wayland H. Riggins
ATTORNEY

PATENTED JUN 20 1972　　　　　　　　　3,670,563

INVENTOR
DAVID J. LIGHT

BY Wayland H. Riggins
ATTORNEY

FIXTURE FOR SUPPORTING ARTICLES DURING VIBRATION TESTS

ORIGIN OF THE INVENTION

The invention described herein was made by an employee of the United States Government and may be manufactured and used by or for The Government for governmental purposes without the payment of any royalties thereon or therefor.

BACKGROUND OF THE INVENTION

This invention relates generally to vibration testing devices and more particularly to a fixture for supporting articles on a vibration exciter during vibration testing of the articles.

The testing of certain kinds of articles as to their ability to withstand vibration is a well established quality control requirement. Vibration testing is particularly important in the manufacture of components to be incorporated in flight vehicles, such as aircraft and rockets, since the components must not fail when subjected to strong vibration forces. One mode of vibration testing of relatively small items, such as electrical components, involves securing the items on a bracket or fixture and mounting the fixture on the driver head of a vibration exciter. The fixture and thus the items being tested are subjected to sine and random vibrations over the frequency ranges and g levels indicated for the test. For example, the frequency ranges may be from 5 cps to about 3,800 cps and at g levels up to and above 100 g's.

Prior art fixtures for supporting small items during vibration testing are not entirely satisfactory in several respects. They are capable of holding only a relatively small number of test items for simultaneous testing which results in multiple test runs and undue costs and time requirement when testing items in large numbers. Also, due to the construction and configuration of prior art fixtures for vibration testing, these fixtures have a lower resonant frequency than is desirable. For example, if the fixture begins to resonate at 2,000 cps during a vibration test it is impossible to perform a vibration test of the items supported by the fixture at or above 2,000 cps without "interference"frequencies being introduced by the fixture. Another objection to existing fixtures is that their structure causes the item secured on the fixture during the vibration test to be positioned somewhat out of line with the driver coil of the vibration exciter and too far from the driver head of the exciter. For efficient and effective application of the vibration force to the test items, the items should be positioned in line with the driver coil and should be positioned as near as possible to the driver head to minimize side to side motion of the test items during the vibration tests.

SUMMARY OF THE INVENTION

The invention comprises a fixture for firmly supporting articles, such as electrical components and devices, during vibration testing of the articles. The fixture comprises an annular unit having a plurality of spaced blind cavities in the top surface of the fixture and a plurality of spaced blind cavities in the outer periphery of the fixture. The fixture is adapted to be mounted on the driver head of a vibration exciter with its vertical axis substantially aligned with the vertical axis of the driver coil of the vibration exciter. Articles to be vibration tested are secured in the cavities of the fixture and during the test are positioned in line with the force exerted by the driver coil. According to one embodiment of the fixture the cavities in the fixture may be in the form of partially threaded bores with an intermediate shoulder to receive a disk and a clamping nut for securing test items in the bores.

Accordingly, it is a general object of the present invention to provide an improved fixture for supporting relatively small test articles during vibration testing.

A more specific object of the invention is to provide a fixture that will simultaneously support an increased number of test articles for vibration testing in selectively different planes to greatly reduce the time and cost of vibration testing of large numbers of articles.

Another object of the invention is to provide a fixture for supporting vibration test articles, such as electrical components and devices, near to and in line with the driver coil of a vibration exciter.

Another object of the invention is to provide a fixture for supporting electrical components and devices on a vibration exciter which fixture has resonant frequency characteristics such as not to produce vibrations that interfere with the test vibrations.

These and other objects and advantages of the invention will become apparent upon reference to the following specification, attached claims and drawing.

DESCRIPTION OF THE PREFERRED EMBODIMENTS

Figure 1:
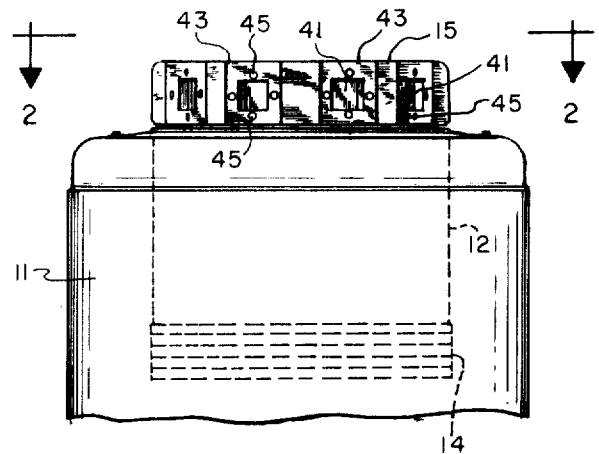
FIG. 1 is an elevational view of the upper portion of a vibration exciter with a vibration fixture according to the invention mounted on the driver head of the exciter.

Referring to FIG. 1, therein is shown a vibration exciter 11 the purpose of which is to subject relatively small articles, such as electrical components and devices, to vibrations similar to the vibrations that the articles may be subjected to under actual use conditions. Such vibration exciters are used a great deal, for example, in the testing of parts that are incorporated in space vehicles to assure that the parts will not fail under the strong and high-frequency vibrations produced by rocket engines. The vibration exciter 11 comprises a cylinder 12 (FIGS. 1 and 3) disposed vertically and centrally of the exciter. The cylinder 12 includes a driver head 13 at the top thereof and an electrically driven driver coil 14 (FIG. 1) is located at the lower end of the cylinder. The coil 14 is joined to and vertically aligned with the cylinder 12, being of annular configuration and having a diameter substantially equal to the diameter of the cylinder 12. The cylinder 12 oscillates vertically with the driver coil at frequencies and forces which may be varied in accordance with the particular vibration test being conducted. The vibration exciter 11 represents a conventional, standard commercial device and further detailed description or illustration thereof is not essential to the understanding of the invention.

Mounted on the driver head 13 of the vibration exciter 11 is a novel fixture 15 for supporting test items during a vibration test. The fixture 15 is secured to the driver head 13 by bolts 17 (FIG. 2) passing through holes 19 in the fixture 15. A relatively thin plate 21 and a diaphragm 23 are interposed between the fixture 15 and the driver head 13. Each of the bolts 17 passes threaded through radially spaced spacers 25 joined to the plate 21 and on which the fixture 15 bears. Integral triangular stiffening ribs 26 are spaced around the cylinder 12 between the driver head 13 and the cylinder wall.

Figure 3:
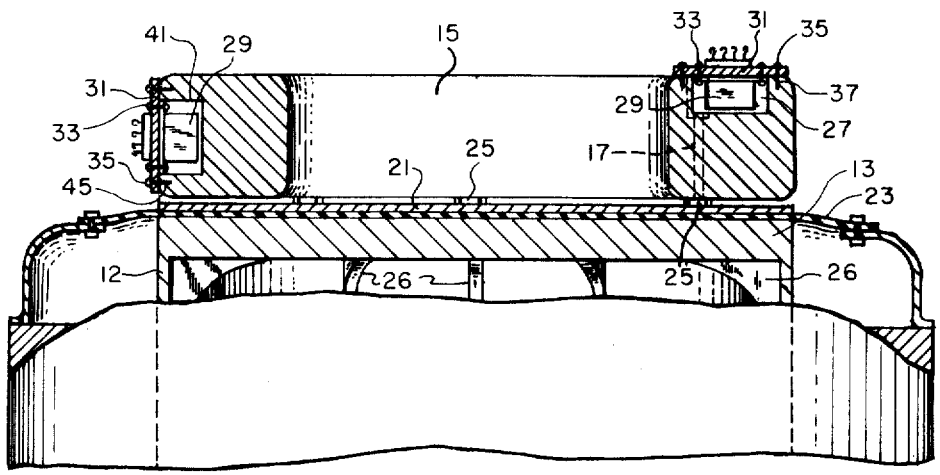
FIG. 3 is a cross sectional view of the vibration test fixture of FIG. 2 taken along line 3—3 of FIG. 2.
Figure 2:
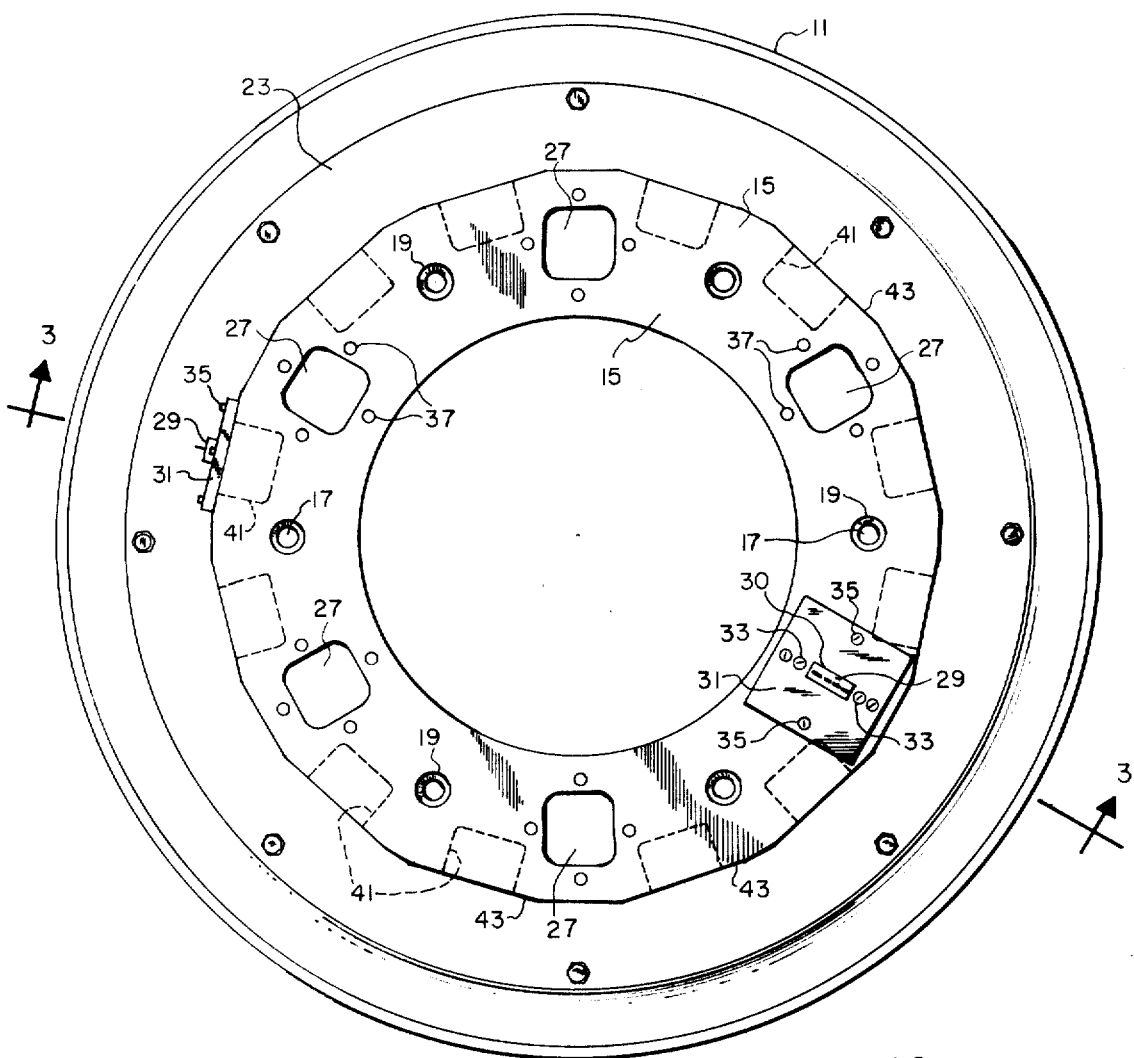
FIG. 2 is an enlarged plan view taken along line 2—2 of FIG. 1 showing only two test articles mounted on the vibration fixture for the sake of clarity.

The fixture 15 is annular in shape and relatively low in profile. The top surface of the fixture is coplanar and is provided with a series of spaced blind cavities 27 of uniform size and shape and being rectangular in plan view. The cavities 27 are centered on a circular line and are radially spaced sixty degrees on center. The cavities are adapted for receiving and securing test items, such as electrical components, during vibration testing. As shown in FIGS. 2 and 3, a test item 29, representing an electric relay, is mounted in a cavity 27. The relay 29 is positioned in an opening 30 in a mounting plate 31, being secured by screws 33, and the plate 31 is secured to the fixture 15 by screws 35 engaging threaded holes 37 around the cavity 27. The cavities 27 do not extend through the fixture 15 but are relatively shallow. The holes 19 for bolts 17 are located intermediate the cavities 27 and the centers of the holes 19 are in circular alignment radially spaced sixty degrees on center around the fixture 19.

Around the outer circumferential or peripheral surface of the fixture 15 are a series of blind cavities 41 that are similar in size and shape to the cavities 27. However, the number of cavities 41 is double the number of cavities 27, there being six of the cavities 27 and twelve of the cavities 41. The cavities 41 are centered on radial lines from the center of the fixture 15 and are entirely offset radially from the cavities 27 so as not to have any area thereof coinciding or in the same vertical plane with the cavities 27. Thus, in the illustrated embodiment the spacing between the cavities 41 alternates between 26° on center and 34° on center.

The circumferential surface of the fixture 15 is made with straight or flat surfaces 43 around the cavities 41 to permit the use of the flat mounting plates 31 in mounting relays 29 in the cavities 41. The plates 31 are secured by screws 35 mating with threaded holes 45.

The fixture 15 is an integral unit of low profile having a relatively high resonant frequency when it is secured to the driver head 13 so as not to produce interference with the test frequencies up to about 3,800 cps. The annular low profile configuration of the fixture gives it a relatively low mass and this along with the mounting means comprising bolts 17 radially spaced not more than 60° on center contribute to the high resonant frequency of the fixture when it is secured to the driver head 13. Moreover, the annular shape of the fixture corresponds to the shape of the driver coil in the vibration exciter and the fixture is mounted directly above the driver coil in vertical alignment therewith. Therefore, the test articles supported by the fixture are also positioned in direct alignment with the vibration forces produced by the driver coil. The fixture is preferably made of a lightweight metal such as magnesium or aluminum.

Figure 4:
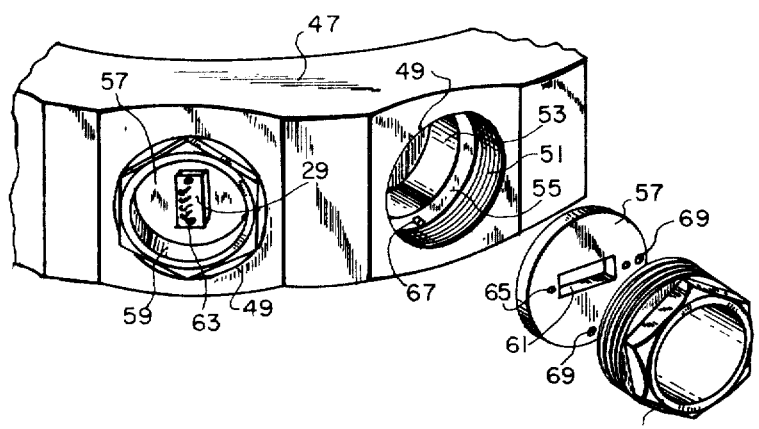
FIG. 4 is an enlarged perspective view, partially exploded, of a portion of a vibration fixture having a modified form of cavity and mounting device for holding test items on the fixture.

FIG. 4 illustrates a portion of a vibration fixture 47 having modified cavities and mounting means for test items. Therein is shown circular blind cavities 49 each comprising an outer threaded portion 51 and an inner smooth portion 53 with the latter portion being of relatively smaller diameter to form a shoulder or seat 55. The threaded portion 51 of the cavities receives a mounting disk 57 and an annular threaded nut 59. The nut 59 clamps the disk 57 against the seat 55 to provide a convenient and effective means for firmly securing test items 29 in the cavities 49. The test items 29 are positioned in an opening 61 in the disk 57 being secured by screws 63 threaded in holes 65. A pilot pin 67 projecting from the seat 55 fits alternately in holes 69 in the disk 57. The holes 69 are spaced 90° apart so that the disk may be rotated 90° to vary the test position of the test items 29.

I claim:

1. A fixture for supporting and securing vibration test articles during vibration testing of the articles on a vibration exciter of the type having a driver head and a driver coil comprising:

a. an annular unit corresponding in shape to the driver coil of the vibration exciter with which said unit is to be used;
   b. said unit having a substantially coplanar top surface, a substantially coplanar bottom surface and an outer circumferential surface;
   c. said unit having a plurality of radially spaced blind cavities for containing vibration test articles located around said top surface of said unit and opening at said top surface;
   d. said unit having a plurality of radially spaced blind cavities for containing vibration test articles located around said outer circumferential surface of said unit and opening at said outer circumferential surface;
   e. said cavities opening at said top surface being entirely offset radially from said cavities opening at said outer circumferential surface;
   f. said unit having a plurality of holes adjacent each of said cavities for facilitating the mounting of vibration test articles in said cavities;
   g. said holes being small in size relative to said cavities.

2. The invention as defined in claim 1 wherein at least one of said cavities is circular, said circular cavity having varying diameters forming an annular shoulder within said circular cavity, the outer portion of said circular cavity being threaded, a disk bearing on said shoulder, an annular nut engaging said threaded portion and bearing on said disk.

3. The invention as defined in claim 2 including an opening in said disk for receiving a vibration test article.

4. The invention as defined in claim 1 wherein at least six of said cavities for receiving test articles are formed in said top surface of said unit and at least six of said cavities for receiving test articles are formed in said outer circumferential surface of said unit.

5. The invention as defined in claim 4 wherein said cavities for receiving test articles are centered at substantially sixty degree spacings radially around said top surface, two of said cavities around said outer peripheral surface being located between each of said 60° radial spacings.

6. The invention as defined in claim 4 including a vibration exciter having a driver head and a driver coil, said unit being rigidly mounted on said driver head in substantially vertical alignment with said driver coil, a vibration test article mounted in one of said cavities in said top surface and a vibration test article mounted in one of said cavities around said outer circumferential surface.

7. The invention as defined in claim 6 including a test article mounting plate supporting each of said test articles, said mounting plate overlying each of said cavities in which said test articles are mounted, fasteners extending through said plate and into said holes adjacent said cavities.

8. The invention as defined in claim 6 including a plurality of fasteners extending through said unit and engaging said vibration exciter, said fasteners being radially spaced around said unit, the radial spacing between any two of said fasteners not substantially exceeding 60°.

* * * * *